Figure 2:

United States Patent [19]

Roe et al.

[11] Patent Number: 4,608,237

[45] Date of Patent: Aug. 26, 1986

[54] USE OF POLYMERS IN ALUMINA PRECIPITATION IN THE BAYER PROCESS OF BAUXITE BENEFICIATION

[75] Inventors: William J. Roe, Aurora; Jacqueline L. Perisho, Oak Park, both of Ill.

[73] Assignee: Nalco Chemical Company, Oak Brook, Ill.

[21] Appl. No.: 797,717

[22] Filed: Nov. 13, 1985

Related U.S. Application Data

[63] Continuation-in-part of Ser. No. 726,544, Apr. 24, 1985, abandoned.

[51] Int. Cl.⁴ .............................................. C01F 7/04
[52] U.S. Cl. ................................. 423/122; 423/121; 423/130
[58] Field of Search .................... 423/121, 122, 130

[56] References Cited

U.S. PATENT DOCUMENTS

| | | | |
|---|---|---|---|
| 3,575,868 | 4/1971 | Galvin et al. | 423/121 |
| 3,716,617 | 4/1970 | Oku et al. | 423/121 |
| 3,755,531 | 8/1973 | Tsukawaki et al. | 423/121 |
| 3,899,571 | 8/1975 | Yamada et al. | 423/127 |
| 4,038,039 | 7/1977 | Carruthers et al. | 423/121 |
| 4,046,855 | 9/1977 | Schepers et al. | 423/121 |
| 4,478,795 | 10/1984 | Hereda et al. | 423/121 |

FOREIGN PATENT DOCUMENTS 2112366  1/1983  United Kingdom ............... 423/130

*Primary Examiner*—H. T. Carter
*Attorney, Agent, or Firm*—John G. Premo; Donald G. Epple

[57] ABSTRACT

The negative effects of sodium oxylate on the crystallization of aluminum trihydrate from Bayer process liquors may be eliminated or curtailed by adding an effective amount of a polyacrylic acid with a molecular weight about 1,000,000 and containing at least 50 mole percent acrylic acid monomer to pregnant Bayer process liquors.

11 Claims, 6 Drawing Figures

ELECTRON PHOTOMICROGRAPHS OF ALUMINA
TRIHYDRATE CRYSTALS FROM LAB PRECIPITATIONS

WITH POLYMER B

NO TREATMENT

ELECTRON PHOTOMICROGRAPHS OF ALUMINA
TRIHYDRATE CRYSTALS FROM LAB PRECIPITATIONS

ELECTRON PHOTOMICROGRAPHS OF ALUMINA
TRIHYDRATE CRYSTALS FROM LAB PRECIPITATIONS

USE OF POLYMERS IN ALUMINA PRECIPITATION IN THE BAYER PROCESS OF BAUXITE BENEFICIATION

INTRODUCTION

This is a continuation-in-part application from copending patent application, Ser. No. 726,544, filed 4/25/85 now abandoned.

In the Bayer process for Bauxite ore beneficiation, crystallization and precipitation of solubilized alumina trihydrate values from caustic liquors, referred to herein as Bayer process liquors, is a critical step towards the economic recovery of aluminum values. Bayer process operators optimize their precipitation methods so as to produce the greatest possible yield from the Bayer process liquors while maintaining a given crystal size distribution. It is desirable to obtain relatively large crystal size since this is beneficial in following processing steps required to recover aluminum metal. Production is often limited by processing conditions under which the crystallization and precipitation is conducted. These processing conditions include, but are not limited to, temperature profiles, seed charge, seed crystal surface area, liquor loading, liquor purity, and the like.

It is an extremely well known fact that organic impurities in the Bayer process liquors, which are normally derived from organics present in the Bauxite ore, or the breakdown products of these organics, have a devasting effect on Bayer process crystallization practices.

In addition to humate chemicals derived from the impure Bauxite ores, another primary organic contaminant is sodium oxalate. Sodium oxalate is thought to be produced during the high temperature digestion of the raw material Bauxite ore in highly concentrated caustic solutions. Recent studies also suggest that some sodium oxalate may be present in the Bauxite ore itself. Regardless of the source of sodium oxalate, its presence in Bayer process liquors is problematical for a number of reasons:

First, sodium oxalate is only minimally soluble in the strong caustic solutions which are recirculating in the Bayer process itself. Sodium oxalate is stabilized in caustic liquors by the presence of other organics which are found in the Bayer process liquors. The end result of this oxalate solubilization and other impurity retention is one of decreased liquor loading of sodium aluminate in recirculating Bayer process liquors.

Another major problem with sodium oxalate occurs because sodium oxalate crystalizes and co-precipitates from solution over essentially the same temperature profiles as does the desired alumina trihydrate crystals. As a result, this coprecipitation causes a great deal of difficulty in recovering alumina trihydrate crystals which have crystal characteristics desired by Bayer process operators. In the presence of other organic contaminates such the humates, the sodium oxalate crystalizes as very fine crystals with an extremely large total surface area. These fine oxalate particulates can then act as secondary nucleation sites for alumina trihydrate, thereby increasing the total number of alumina crystals during the alumina trihydrate precipitation. This has an effect of causing a shift to smaller alumina trihydrate crystal size distribution and the production of very finely divided materials.

The production of fines or undersized alumina trihydrate crystals is extremely problematical since these materials must be recycled as seed for additional crystal growth and may not be used in the production of aluminum metal. As a result, the production rates of aluminum trihydrate are negatively effected, the seed balance in the Bayer process is skewed, and poor alumina trihydrate crystal size distributions are observed which the aluminum manufacturer finds difficult to use in the electrolytic production of the metal. The nucleation of the alumina by the sodium oxalate crystals cannot normally be controlled in the Bayer process unless precipitation temperatures are increased greatly. However, this increased temperature has the undesirable effect of lowering the alumina trihydrate yields per volume of liquors exposed to the seeding and crystallization process.

Finally, during the coprecipitation of both sodium oxalate and alumina trihydrate, the oxalate crystals, which are extremely finely divided and have an extremely high surface area, adhere to the surfaces of growing alumina trihydrate agglomerates. This adhesion of the oxalate crystalites interferes with both alumina trihydrate unit crystal growth and the agglomeration of alumina hydrate crystals. Occlusion of this sodium oxalate crystalites within the growing alumina trihydrate multicrystal results in the weakening of the final crystal structure. As above, this is very undesirable since it leads to the development of extremely finely divided alumina trihydrate both during the precipitation process as well as in the alumina trihydrate calcination processes which follow.

PRIOR ART

A number of teachings are available in the prior art which attempt to deal with the sodium oxalate problems occurring in the Bayer process. Among these attempts are German Patent DT 25 53 870 entitled "Oxalic Acid Recovery from Impure Sodium Ozalate in Bayer Process Liquors"; U.S. Pat. No. 4,046,855, entitled "Method of Removing Harmful Organic Compounds from Aluminate Liquor"; U.S. Pat. No. 4,038,039, entitled "Method of Sodium Oxalate Control in Bayer Liquor"; and finally, U.S. Pat. No. 3,899,571, entitled "Method for the Removal of Organic Substances from Aluminate Solution".

A careful review of these references will show various kinds of techniques used by Bayer process operators in an attempt to remove these sodium oxalate materials in order to prevent the negative effects these sodium oxalate materials have on the recovery of alumina trihydrate crystals.

None of the art with which Applicants are familiar attempts to solve the problems encountered in the presence of sodium oxalate in precipitating Bayer process liquors by adding thereto high molecular weight polymers so as to preferentially effect the crystallization of sodium oxalate and thereby remove the effects of its coprecipitation with alumina trihydrate crystalites.

In addition, prior art exists, such as U.S. Pat. No. 3,755,531, and U.S. Pat. No. 3,716,617, which uses high molecular weight acrylate polymers as flocculants for red mud, immediately following the initial digestion of alumina containing Bauxite-type ores. However, as is well known in the art, the polymeric acrylic flocculants used to rapidly settle red mud components are entrapped in the flocculated red mud particles and are carried down with this particulate red mud during this red mud settling step. Therefore, after red mud settling, the pregnant Bayer liquor obtained after settling and separation of red mud does not contain any detectable amounts of these types of polymeric flocculant additives.

THE INVENTION

The current invention involves the use of high molecular weight anionic polymers which are added to Bayer process liquors immediately prior to the crystallization of alumina trihydrate from pregnant Bayer liquors to alter the nature of sodium oxalate crystals forming during the crystallization process within the Bayer process itself. Addition of these high molecular weight anionic polymers prior to the onset of oxalate nucleation appears to result in both crystal modification of the sodium oxalate as well as an agglomeration of the precipitated oxalate crystals. This designed crystal modification of sodium oxalate crystals precipitated from Bayer liquor produces large clusters of the impurity which can be demonstrated to be inocuous with respect to the coprecipitation of alumina trihydrate. In theory, either the agglomeration of the fine oxalate crystals or the coarsening of these crystals, that is an increase in overall oxalate crystal size, should accomplish one or more of the following:

A reduction in the tendency of fine sodium oxalate to act as secondary nucleation sites for alumina trihydrate.

A Reduction of the tendency of fine sodium oxalate crystalites to adhere to the surfaces of growing alumina trihydrate crystals thereby improving opportunities for these alumina trihydrate crystals to agglomerate and improving multicrystal strengths.

An improvement in alumina trihydrate product since the alumina trihydrate crystals would become coarser and stronger because the sodium oxalate materials can no longer have the deleterious effects normally observed in the Bayer process. The invention is considered unique and novel since oxalate problems are presently handled either by complex removal schemes, or by the alteration of alumina precipitation conditions, both of which have proven undesirable to the Bayer process operator.

It has been demonstrated that the use of the high molecular weight anionic polymers of this invention is selective to the crystal agglomeration and/or modificaton of the sodium oxalate crystalites. The use of the specific anionic polymers of this invention in Bayer process liquors results only in oxalate crystal agglomeration and crystal modification and does not appear to effect the actual alumina trihydrate crystallization in that these alumina trihydrate crystals do not appear to be directly agglomerated or modified by the presence of these polymers.

As a result of the invention, the alumina trihydrate precipitations derive a crystal product which is coarser, stronger, contains reduced soda levels, and leads to increased alumina trihydrate yield, and improved oxalate removal during the alumina washing and filtration since the consolidation of oxalate fines and reduction oxalate occlusion in the alumina trihydrate occurs under the method of this invention.

As a result, the instant invention is a method of reducing the percent alumina trihydrate crystals smaller than 200 microns in diameter, which crystals are produced during the crystallization of alumina trihydrate, $Al_2(OH)_6$, from pregnant Bayer process liquors contaminated with sodium oxalate, and which comprises adding to the pregnant Bayer process liquors, prior to crystallization of alumina trihydrate, an effective amount of a high molecular weight polyacrylic acid having a weight average molecular weight of at least one million and containing at least 50 mol percent acrylic acid monomer.

Preferentially, the polyacrylic acid polymers which are used in the invention contain at least 75 mol percent acrylic acid monomer, and most preferably these polyacrylic acids contain at least 90 mol percent acrylic acid monomer.

The molecular weights of these polyacrylic acids are at least one million, are preferably above 5 million, and most preferably exceed 7.5 million. In all cases, the molecular weights referred to are weight average molecular weights.

The polyacrylic acid polymers of this invention are normally produced by the free radical vinylic polymerization of acrylic acid monomers, or common salts thereof, either in solution, in water-in-oil latex polymerizations, or by radiation techniques forming gels, and the like. After polymerization occurs, the product may be added to the Bayer process either as a solution, as a water-in-oil emulsion, or as a dry solid or gelatinous concentrated product.

The polyacrylic acid polymers of this invention are preferably added to pregnant Bayer process liquors prior to seeding with very finely divided alumina trihydrate crystallites. Bayer process liquors are then gradually cooled over a period of time so that crystallization occurs allowing precipitation of alumina trihydrate crystals and recovery of the alumina trihydrate from the Bayer process pregnant liquors. The polyacrylic acids are normally added at concentrations ranging between 5 parts per million, based on the total weight of pregnant Bayer process liquors, up to about 500 parts per million. Preferably, the polyacrylic acids of this invention are added at concentrations ranging between about 5.0 parts per million and about 300 parts per million. The effectiveness of the polymer may be affected by other process variables such as temperature, liquor loading, seed crystals surface area, oxalate concentrations, organic contaminant concentrations such as humate concentrations, and the like. Therefore, it is the intent to cover the addition of an effective amount of the polyacrylic acids of this invention to Bayer process liquors prior to seeding with seed crystallites and cooling to induce alumina trihydrate crystallization, precipitation, and recovery.

The acrylic acid monomers used to form the polyacrylic acid polyers of this invention are those monomers derived from acrylic acid, methacrylic acid, and salts thereof. When we refer to salts of acrylic acid or methacrylic acid, we mean the sodium salts, potassium salts, ammonium salts, and any other water-soluble salts of acrylic acid that might be derived from the alkali metals, alkaline earth metals, transition metals, and the like. Of particular value are the sodium and ammonium salts of acrylic acid. These salts may be formed prior to polymerization of acrylic acid monomer or after polymerization has occurred by neutralizing the polyacrylic acid formed with the corresponding base of sodium or ammonium hydroxides.

The polyacrylic acid polymers of this invention may also include other monomers. Particularly, these monomers may include methacrylic acid, acrylamide, methacrylamide, 2-acrylamidopropylsulfonate (2-AMPS), vinylsulfonate, maleic anhydride, sulfonated styrene, and the like.

By pregnant Bayer Process liquors we mean those liquors obtained from the part of the Bayer Process immediately following the digestion of Bauxite ores and separation of red mud particulates by settling, filtration, or such combined technique as may be involved in removing insolubles such as red mud from the Bayer Process liquors. Pregnant Bayer Process liquors are those liquors which would normally contain maximum values of alumina in the form of sodium aluminate salts, alumina trihydrate, or the various complexes thereof which are dissolved in or suspended in the recirculating Bayer Process liquors. These pregnant liquors are normally circulating at elevated temperature so as to maintain solubility of alumina trihydrate until that time in the process where these liquors are seeded with aluminum trihydrate crystallites and cooled to induce the crystallization and initiate the recovery of aluminum trihydrate from the Bayer Process. Each Bayer Process operator controls crystallization differently, depending upon the particular characteristics of his operation, such as quality, organic contamination, alkali concentration, and the like. Crystallization occurs by cooling pregnant liquors and this crystallization is often, if not always, additionally induced by seeding the pregnant liquors immediately prior to cooling or during the cooling step with trihydrate crystallites. Addition of an effective amount of the polymers of this invention to pregnant Bayer liquors occurs after red mud separation but immediately prior to crystallization, preferably prior to seeding, and most preferably prior to initiation of cooling. After crystallization, the alumina trihydrate is separated from spent Bayer Process liquors, which spent liquors can contain additional sodium oxalate. Continued cooling, enhanced by seeding with oxalate crystallites, can additionally remove oxalate contaminants. Again, addition of our polymers to spent Bayer liquors can achieve improved results for removing these oxalate impurities.

Particularly good results are obtained by adding to the Bayer process liquors, prior to seeding, polyacrylic acids in either the sodium or ammonium salt form, which polyacrylic acids are homopolymers of acrylic acid or acrylic acid salt monomers. Other superior results are obtained when sodium acrylate is polymerized with monomers such as acrylamide or acrylamidopropylsulfonate. When copolymers of acrylic acid are used in the instant invention, these copolymers must have a weight average molecular weight in excess of one million, preferably in excess of 5 million, and most preferably in excess of 7.5 million, and will contain from 1–50 mole percent of a monomer other than acrylic acid. When copolymers are used, the monomer other than acrylic acid will preferably be present at from 5–25 mole percent, and will preferably be chosen from the group consisting of acrylamide, 2-AMPS, vinyl sulfonate, and mixtures thereof.

The most active high molecular weight polyacrylic acid flocculant polymers are listed below:

TABLE I

| Polymer | Chemical Description |
|---|---|
| A | Sodium polyacrylate, water-in-oil latex form, containing 29–31% active polymer, Reduced Specific Viscosity = 25–35. |
| B | Ammonium polyacrylate polymer in water-in-oil latex form, containing 38–42 weight percent active polymer having a Reduced Specific Viscosity ranging between 25–35. |
| C | A 43 mole percent acrylamide/57 mole percent sodium acrylate polymer in water-in-oil latex form containing 28–32 weight percent active polymer having a Reduced Specific Viscosity ranging between 30–40. |
| D | 90 mole percent sodium acrylate/10 mole percent 2-AMPS, in water-in-oil latex form containing 28–32 weight percent active polymer having a Reduced Specific Viscosity ranging between 25–30. |
| E | 95 mole percent sodium acrylate/5 mole percent acrylamide in water-in-oil latex form containing 28–32 weight percent active polymer having a Reduced Specific Viscosity ranging between 25–35. |
| F | 90 mole percent sodium acrylate/10 mole percent acrylamide polymer in water-in-oil latex form containing 28–32 weight percent active polymer having a Reduced Specific Viscosity ranging between 25–35. |
| G | 75 mole percent sodium acrylate/25 mole percent acrylamide polymer in water-in-oil latex form containing 28–30 weight percent active polymer having a Reduced Specific Viscosity ranging between 45–60. |

The polymers of this invention may also be effectively used to treat spent Bayer process liquors following precipitation and crystallization of alumina trihydrate for the purpose of removing sodium oxalate crystals. To do so, the polymers of this invention are added to spent Bayer liquors at an effective amount to accomplish the agglomeration of sodium oxalate crystals when these spent liquors are further cooled and seeded with sodium oxalate crystallites to encourage crystallization and precipitation of dissolved sodium oxalates present in the spent liquors. It is anticipated that an effective amount of the polymers described above would require between 10–500 ppm of the polymer chosen. A preferred concentration is anticipated to be between about 50–250 parts per million, on a weight basis, of the patent polymer to be used.

As before, the polymers are primarily chosen from polyacrylic acids having a weight average molecular weight ranging between about 1,000,000–50,000,000 and containing at least 50 mole percent acrylic acid monomer, preferably 75 mole percent acrylic acid monomer and most preferably at least 90 mole percent acrylic acid monomer.

As before, the polyacrylic acid materials may contain other vinylic monomer units chosen from the group of vinyl sulfonate, acrylamide, 2-acrylamidopropylsulfonate, maleic anhydride, sulfonated styrene, and the like.

Therefore, our invention includes a method of minimizing the concentration of sodium oxalate crystals in spent Bayer process liquors by adding thereto an effective amount of polyacylic acid having a weight average molecular weight of at least 1,000,000 and containing at least 50 mole percent acrylic acid monomer to a spent Bayer liquor after seeding said Bayer liquor with sodium oxalate crystalites, and subsequently cooling said Bayer liquors to achieve crystallization and precipitation of sodium oxalate therefrom.

The presence of the polyacrylic acids of this invention in this process for crystallizing sodium oxalate from spent Bayer process liquors is expected to cause sodium oxalate crystal agglomeration and modification which would subsequently allow for improved filtration and removal of the agglomerated sodium oxalate crystals formed in this method.

To demonstrate the effectiveness of the claimed invention, the following examples are provided:

EXAMPLES mer A. This coarsening effect is evidenced by the upward shift in size distribution of the crystals obtained in the presence of Polymer A when compared to the crystals obtained in the absence of any polymer.

TABLE II

| | | LAB PRECIPITATION TESTS ALUMINA TRIHYDRATE FROM PREGNANT BAYER LIQUOR | | | |
|---|---|---|---|---|---|
| | | TEST NO. | | | |
| | | 1 | 2 | 3 | 4 |
| | | TREATMENT | | | |
| | | Blank | 50 ppm Polymer A in L-P liquor | Blank | 100 ppm Polymer A in L-P liquor |
| | | ALUMINA SEED | | | |
| | | Plant Trihydrate | Plant Trihydrate | Fine Lab Trihydrate | Fine Lab Trihydrate |
| % of | 300μ | 100.0 | 100.0 | 100.0 | 100.0 |
| alumina | 212μ | 97.5 | 91.8 | 98.0 | 92.4 |
| trihydrate | 150μ | 93.6 | 85.7 | 98.0 | 90.1 |
| crystals | 106μ | 81.8 | 78.9 | 91.4 | 85.5 |
| smaller | 75μ | 60.9 | 52.3 | 74.7 | 66.7 |
| than micron | 53μ | 33.3 | 27.7 | 56.5 | 47.9 |
| size shown | 38μ | 11.7 | 7.2 | 23.9 | 18.1 |
| | 27μ | 3.3 | 1.0 | 13.1 | 6.2 |
| | 19μ | 1.0 | 0.2 | 3.1 | 1.6 |

Seed Charge: Total of 7.02 M$^2$/l
Temperature Profile: 172° F.→160° F. over 21 hours
Liquor Source: Plant Liquor @ 0.69 A/C Ratio
L-P Liquor: Plant Liquor fed to crystallizers.

EXAMPLE 1

100 milliliters of test tank liquor from the Bayer process which contains disolved therein sodium aluminate values at concentrations below those required for crystallization of aluminum trihydrate was heated to 145° F. To this hot solution of test tank liquor was added varying concentrations of Polymer B.

To this hot test tank liquor containing various amounts of Polymer B was added 5 milliliters of a 20% oxalic solution. Upon addition of this oxalic solution with vigorous agitation, immediate precipitate of the sodium oxalate occurred. With the Polymer B present, the precipitation of oxalate crystals occurred with nearly instantaneous agglomeration and effects on crystal growth of these sodium oxalate crystals.

Figure 1:

The oxalate crystals were immediately drawn from the test tank liquor using vacuum filtration and carefully examined using a scanning electron microscope. FIGS. 1 and 2 compare the sodium oxalate crystals obtained from crystallizations from test tank liquors in the absence and in the presence of Polymer B. Careful examination of these FIGS. indicates that the sodium oxalate crystals which are formed in the presence of Polymer B are much larger, are agglomerated, and appear to affect a radial orientation of the fine needle-like structure of the oxylate crystals. In the absence of any polymeric treatment, the sodium oxalate formed in needle-like, finely divided, and non-agglomerated.

EXAMPLE 2

To demonstrate the benefit of the invention during the crystallization process, laboratory precipitations were done in which a pregnant liquor normally fed to the Bayer process precipitators was seeded with a very finely divided alumina in batch crystallizers. The laboratory batch precipitations were carefully temperature-controlled to match conditions normally observed in a Bayer process plant. These alumina trihydrate crystallizations were done both in the presence and absence of Polymer A. Data presented in the following Table indicates the coarsening effect observed when alumina trihydrate crystals are produced in the presence of Poly- In addition, FIGS. 3, 4, 5, and 6 present electron photomicrographs of alumina trihydrate crystals which have been recovered from batch precipitation using either a plant seed crystal or a finely divided laboratory alumina trihydrate seed crystal.

Figure 3:
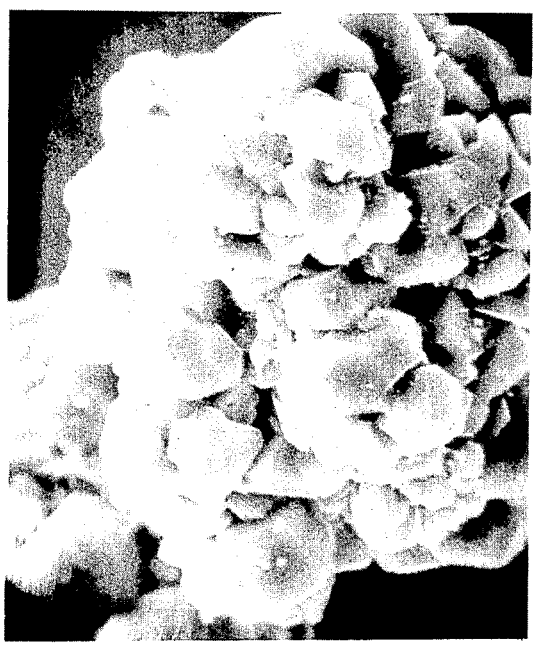

In FIG. 3, alumina trihydrate crystals (magnified 2000×) was isolated from a batch precipitation using a plant seed. Fine oxalate crystals are observed over the entire surface of the trihydrate multicrystal. No polymer was added in this case.

Figure 4:

FIG. 4 shows alumina trihydrate and sodium oxalate crystals magnified 2000×. The multicrystals at the far right and left are alumina trihydrate multicrystals. The center agglomerate is sodium oxalate (verified by EDAX sodium mapping). The agglomeration of the fine oxalate occurred in this case by the addition of 150 ppm of Polymer A prior to nucleation. As is readily observed, the oxylate crystal has been strongly agglomerated and the crystallites present from the oxalate appear not to have caused as severe an interference with the alumina trihydrate crystal formation. These photographs are supported by the data presented in Table II.

Figure 5:
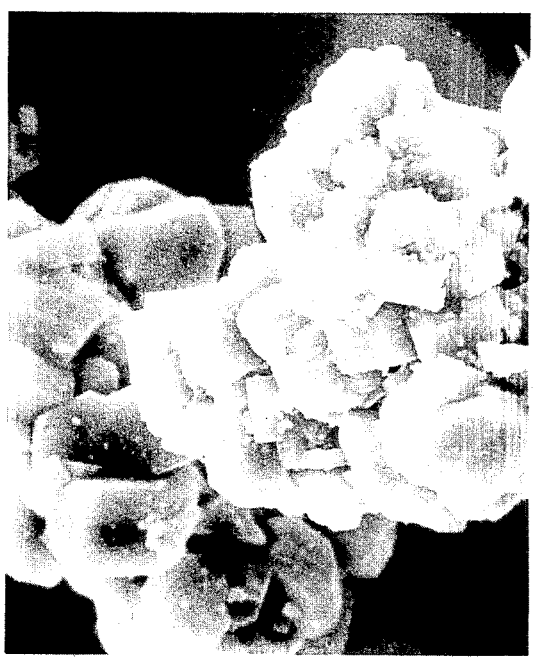

FIG. 5 represents alumina trihydrate crystal (magnified 2000×) which was isolated from a batch precipitation using a special fine trihydrate seed (pure). The surface of the above agglomerate is covered with fine oxalate particulates. No polymer was added in this case.

Figure 6:

FIG. 6 shows alumina trihydrate crystal (magnified 2000×) to which prior to liquor seeding was added 100 ppm of Polymer A. Virtually all traces of fine oxalate have disappeared and much larger spherically-oriented oxalate crystals are evident. The sodium oxalate crystals appear to have been both modified and agglomerated.

EXAMPLE 3

Following the procedures of Example 2, Polymers C, D, E, F, and G were added to pregnant Bayer process liquors prior to seeding with laboratory fine alumina trihydrate. Precipitations were carried out and the results that were obtained indicated that the sodium oxalate crystals were agglomerated and crystal-modified and that the alumina trihydrate crystals were covered had an average particle size greater than the average particle size from an untreated blank system. Although all of the polymers tested gave improvements, the preferred polymer was Polymer D.

If one were to add Polymers A, B, C, D, E, F, G to a spent Bayer process liquor, that is a Bayer process liquor from which alumina trihydrate crystals has been crystallized, precipitated, and removed, with from 10-500 parts per million of these polymers either prior to or immediately after seeding the spent Bayer process liquors with sodium oxalate crystalites, and followed by cooling this treated and seeded spent Bayer process liquors to temperatures which would allow for and encourage the formation of additional sodium oxalate crystals, thereby removing same from the spent Bayer process liquors prior to recycling.

It is anticipated that the polyacrylic acids described as Polymers A, B, D, E, and F. would provide superior results in agglomerating sodium oxalate crystals and allowing for the improved crystallization, precipitation, and removal of this agglomerated oxalate material from the spent Bayer process liquors.

Having described our invention, we claim:

1. A method of reducing the percent alumina trihydrate crystals smaller than 200 micron in diameter, which crystals are produced during crystallization of alumina trihydrate from pregnant Bayer Process liquors contaminated with sodium oxalate, which comprises adding to the pregnant Bayer Process liquors, after red mud separation and immediately prior to crystallization of alumina trihydrate, an effective amount of a high molecular weight polyacrylic acid having a weight average molecular weight of at least one million and containing at least 50 mole percent acrylic acid monomer.

2. The method of claim 1 wherein the polyacrylic acid contains at least 75 mol percent acrylic acid monomer.

3. The method of claim 1 wherein the polyacrylic acid contains at least 90 mol percent acrylic acid monomer.

4. The method of claim 3 wherein the polyacrylic acid contains other vinylic monomer units chosen from the group consisting of vinyl sulfonate, acrylamide, 2-acrylamidopropylsulfonate, maleic anhydride, sulfonated styrene, and the like.

5. The method of claim 1 wherein the polyacrylic acid contains other vinylic monomer units chosen from the group consisting of vinyl sulfonate, acrylamide, 2-acrylamidopropylsulfonate, maleic anhydride, sulfonated styrene, and the like.

6. The method of claim 1 wherein the polyacrylic acid contains at least 90 mol percent acrylic acid monomer and contains additionally vinylic monomer units chosen from the group consisting of vinyl sulfonate, acrylamide, 2-acrylamidopropylsulfonate, maleic anhydride, sulfonated styrene, and mixtures thereof.

7. The method of removing sodium oxalate crystals from spent Bayer process liquors which comprises adding thereto in an effective amount for the purpose of agglomerating sodium oxalate crystals a high molecular weight polyacrylic acid having a weight average molecular weight of at least 1,000,000 and containing at least 50 mole percent acid monomer, and subsequently adding sodium oxalate crystallite seed crystals and cooling to a temperature sufficient to cause additional crystallization and precipitation of dissolved sodium oxalate from the spent Bayer process liquors.

8. The method of claim 7 wherein the polyacrylic acid contains at least 70 mole percent acrylic acid monomer.

9. The method of claim 7 wherein the polyacrylic acid contains at least 90 mole percent acrylic acid monomer.

10. The method of claim 9 where in the polyacrylic acid contains other vinylic monomer units chosen from the group consisting of acrylamide and 2-acrylamidopropylsulfonate.

11. The method of claim 7 wherein the polyacrylic acid contains other vinylic monomer units chosen from the group consisting of acrylamide, 2-acrylamidopropylsulfonate, maleic anhydride, vinyl sulfonate, sulfonated styrene, and the like.

* * * * *